(12) United States Patent
Ambros et al.

(10) Patent No.: US 8,261,816 B2
(45) Date of Patent: Sep. 11, 2012

(54) HEAT EXCHANGER WITH FLAT TUBES

(75) Inventors: Peter Ambros, Kusterdingen (DE); Jörg Soldner, Ehningen (DE); Roland Strähle, Unterensingen (DE); Andreas Stolz, Walddorfhäslach (DE); Dieter Merz, Dotternhausen (DE); Jens Nies, Holzgerlingen (DE); Sven Thumm, Metzingen (DE); Katja Müller, Böblingen (DE); Harald Schatz, Reutlingen (DE); Peter C. Kottal, Racine, WI (US); Frank M. Grippe, Kansasville, WI (US)

(73) Assignee: Modine Manufacturing Company, Racine, WI (US)

( * ) Notice: Subject to any disclaimer, the term of this patent is extended or adjusted under 35 U.S.C. 154(b) by 563 days.

(21) Appl. No.: 11/015,159

(22) Filed: Dec. 17, 2004

(65) Prior Publication Data

US 2005/0161206 A1 Jul. 28, 2005

(30) Foreign Application Priority Data

Dec. 19, 2003 (DE) .................................. 103 59 806

(51) Int. Cl.
- *F28F 1/14* (2006.01)
- *F28F 1/36* (2006.01)
- *F28F 1/00* (2006.01)
- *F28F 9/02* (2006.01)

(52) U.S. Cl. ......... 165/183; 165/158; 165/173; 165/177
(58) Field of Classification Search .................. 165/158, 165/51, 159, 173, 166, 177, 183
See application file for complete search history.

(56) References Cited

U.S. PATENT DOCUMENTS

| 2,178,095 A | 10/1939 | Bowser |
| 2,252,211 A | 8/1941 | Seemiller |
| 2,329,789 A * | 9/1943 | Schank et al. ................... 72/187 |
| 2,615,687 A | 10/1952 | Simmons |
| 2,735,698 A * | 2/1956 | Brinen ..................... 285/148.11 |
| 2,782,009 A * | 2/1957 | Rippingille ................... 165/166 |
| 2,819,731 A | 1/1958 | Louthan |

(Continued)

FOREIGN PATENT DOCUMENTS

CH 318033 12/1956

(Continued)

OTHER PUBLICATIONS

English Abstract of JP 01305296A.*

(Continued)

*Primary Examiner* — Brandon M Rosati
(74) *Attorney, Agent, or Firm* — Michael Best & Friedrich LLP

(57) ABSTRACT

A heat exchanger with a plurality of stacked flat tubes and a collecting tank having a wall extending around the entire periphery of, and connected to, the end of the stacked flat tubes. A first medium may be distributed through the collecting tank and flat tubes. Internal inserts are in the flat tubes, with the inserts being bonded between the broad sides of the tubes and, in the region of connection of the tubes to the collecting tank, being configured to compensate for length changes in the stacking direction caused by temperature changes, as by recesses in connectors such as wave flanks or by corrugated wave flanks. The flat tubes with inserts such as described may be separately provided for use in manufacture of heat exchangers.

27 Claims, 9 Drawing Sheets

U.S. PATENT DOCUMENTS

| | | | |
|---|---|---|---|
| 3,262,495 | A | 7/1966 | Baird |
| 3,313,343 | A * | 4/1967 | Ware et al. ............... 165/166 |
| 3,372,743 | A | 3/1968 | Pall et al. |
| 4,096,616 | A | 6/1978 | Coffinberry |
| 4,303,052 | A | 12/1981 | Manfredo et al. |
| 4,420,039 | A * | 12/1983 | Dubrovsky ............... 165/152 |
| 4,428,418 | A | 1/1984 | Beasley et al. |
| 4,436,145 | A | 3/1984 | Manfredo et al. |
| 4,474,162 | A | 10/1984 | Mason |
| 4,733,722 | A | 3/1988 | Forbes et al. |
| 4,823,868 | A | 4/1989 | Neebel |
| 4,903,762 | A | 2/1990 | Marsais et al. |
| 5,029,636 | A * | 7/1991 | Kadle ............... 165/109.1 |
| 5,307,870 | A | 5/1994 | Kamiya et al. |
| 5,417,280 | A | 5/1995 | Hayashi et al. |
| 5,560,424 | A * | 10/1996 | Ogawa ............... 165/183 |
| 5,625,229 | A * | 4/1997 | Kojima et al. ............... 257/712 |
| 5,636,685 | A * | 6/1997 | Gawve et al. ............... 165/109.1 |
| 5,671,806 | A | 9/1997 | Schmalzried |
| 5,685,075 | A | 11/1997 | Kato |
| 5,845,701 | A | 12/1998 | Ruppel et al. |
| 5,996,633 | A | 12/1999 | Kato |
| 6,019,169 | A | 2/2000 | Ruppel et al. |
| 6,164,370 | A | 12/2000 | Robinson et al. |
| 6,179,050 | B1 * | 1/2001 | Dey et al. ............... 165/149 |
| 6,293,337 | B1 * | 9/2001 | Strahle et al. ............... 165/166 |
| 6,474,408 | B1 | 11/2002 | Yeh et al. |
| 6,729,388 | B2 * | 5/2004 | Emrich et al. ............... 165/153 |
| 6,904,965 | B2 | 6/2005 | Beck et al. |
| 6,920,918 | B2 * | 7/2005 | Knecht et al. ............... 165/157 |
| 6,964,296 | B2 | 11/2005 | Memory et al. |
| 7,032,313 | B2 | 4/2006 | Memory et al. |
| 7,077,190 | B2 | 7/2006 | Hayashi et al. |
| 7,107,680 | B2 | 9/2006 | Ueda |
| 7,174,948 | B2 | 2/2007 | Schindler et al. |
| 7,204,302 | B2 | 4/2007 | Shibagaki et al. |
| 7,255,159 | B2 | 8/2007 | Sagasser et al. |
| 7,367,386 | B2 | 5/2008 | Sato et al. |
| 7,487,589 | B2 * | 2/2009 | Smith et al. ............... 29/890.043 |
| 8,016,025 | B2 | 9/2011 | Brost et al. |
| 2002/0007935 | A1 | 1/2002 | Marsala |
| 2003/0010480 | A1 * | 1/2003 | Shibagaki et al. ............... 165/158 |
| 2004/0177668 | A1 * | 9/2004 | Sagasser et al. ............... 72/326 |
| 2005/0161206 | A1 | 7/2005 | Ambros et al. |
| 2005/0224070 | A1 | 10/2005 | Hanai et al. |
| 2006/0201663 | A1 | 9/2006 | Strahle et al. |
| 2006/0231240 | A1 | 10/2006 | Rothenhofer et al. |
| 2006/0283585 | A1 * | 12/2006 | Smith et al. ............... 165/177 |
| 2007/0012430 | A1 | 1/2007 | Duke et al. |
| 2007/0056721 | A1 | 3/2007 | Usui et al. |
| 2007/0114007 | A1 | 5/2007 | Schindler et al. |
| 2007/0175617 | A1 | 8/2007 | Brost et al. |
| 2007/0227715 | A1 | 10/2007 | Shimoya et al. |
| 2008/0041556 | A1 | 2/2008 | Braun et al. |
| 2008/0047696 | A1 | 2/2008 | Sperandei et al. |
| 2009/0025916 | A1 | 1/2009 | Meshenky et al. |
| 2009/0194265 | A1 | 8/2009 | Nakamura |
| 2009/0250201 | A1 | 10/2009 | Grippe et al. |
| 2010/0025024 | A1 | 2/2010 | Meshenky et al. |

FOREIGN PATENT DOCUMENTS

| | | | |
|---|---|---|---|
| DE | 2903543 | | 8/1980 |
| DE | 3743293 | | 6/1989 |
| DE | 3815070 | | 11/1989 |
| DE | 4223423 | | 1/1994 |
| DE | 4307053 | | 9/1994 |
| DE | 4313505 | | 10/1994 |
| DE | 19519633 | | 12/1996 |
| DE | 69315281 | | 3/1998 |
| DE | 19644584 | | 4/1998 |
| DE | 19651625 | | 6/1998 |
| DE | 19853455 | | 6/1999 |
| DE | 19836889 | | 2/2000 |
| DE | 20003919 | | 5/2000 |
| DE | 19902004 | | 7/2000 |
| DE | 10040645 | | 6/2002 |
| DE | 10238882 | | 5/2003 |
| DE | 10242311 | | 3/2004 |
| DE | 10359806 | | 7/2005 |
| DE | 202004020294 | | 5/2006 |
| DE | 102005034997 | | 2/2007 |
| EP | 0242063 | | 10/1987 |
| EP | 0584806 | | 3/1994 |
| EP | 0704667 | | 4/1996 |
| EP | 0974804 | | 1/2000 |
| EP | 1376043 | | 1/2004 |
| EP | 1411315 | | 4/2004 |
| EP | 1464908 | | 10/2004 |
| EP | 1522811 | | 4/2005 |
| EP | 1544564 | | 6/2005 |
| FR | 2447529 | | 8/1980 |
| FR | 2777645 | | 10/1999 |
| GB | 1129924 | | 10/1968 |
| JP | 1305296 | A | 12/1989 |
| JP | 01305296 | A * | 12/1989 |
| JP | 4198692 | | 7/1992 |
| JP | 4332392 | | 11/1992 |
| JP | 08025028 | A * | 1/1996 |
| JP | 2000097589 | | 4/2000 |
| JP | 2000121286 | | 4/2000 |
| JP | 2000121286 | A * | 4/2000 |
| JP | 2000304486 | | 11/2000 |
| JP | 2003106785 | A * | 4/2003 |
| JP | 2003240387 | | 8/2003 |
| JP | 2007003029 | | 1/2007 |
| JP | 2007-225190 | | 9/2007 |
| RU | 2047081 | | 10/1995 |
| RU | 2047081 | C1 * | 10/1995 |
| WO | 2004085947 | | 10/2004 |
| WO | 2005/001366 | | 1/2005 |
| WO | 2006/010463 | | 2/2006 |

OTHER PUBLICATIONS

English Abstract of JP 01305296A, Dec. 1989.*
PCT/US2008/051747 International Search Report, 3 pages, Dated Jun. 5, 2008.
Office Action from United States Patent Office for Application No. 11/594,454 dated Feb. 3, 2010 (8 pages).
First Office Action from the State Intellecutal Property Office of the People's Republic of China for Application No. 200880002935.6 dated Jul. 15, 2010 (3 pages—English Translation).
PCT/US2008/051747 International Preliminary Report on Patentability dated Aug. 6, 2009 (6 pages).
Chinese Office Action for Application No. 200880002935.6 dated Jan. 26, 2011 (3 pages).
DE10359806.5 German Search Report, dated Feb. 3, 2005, 3 pages.
EP04027604 European Search Report, dated Apr. 12, 2005, 3 pages.
Office Action for United States Application No. 12/061,191 dated Aug. 22, 2011, 8 pages.

* cited by examiner

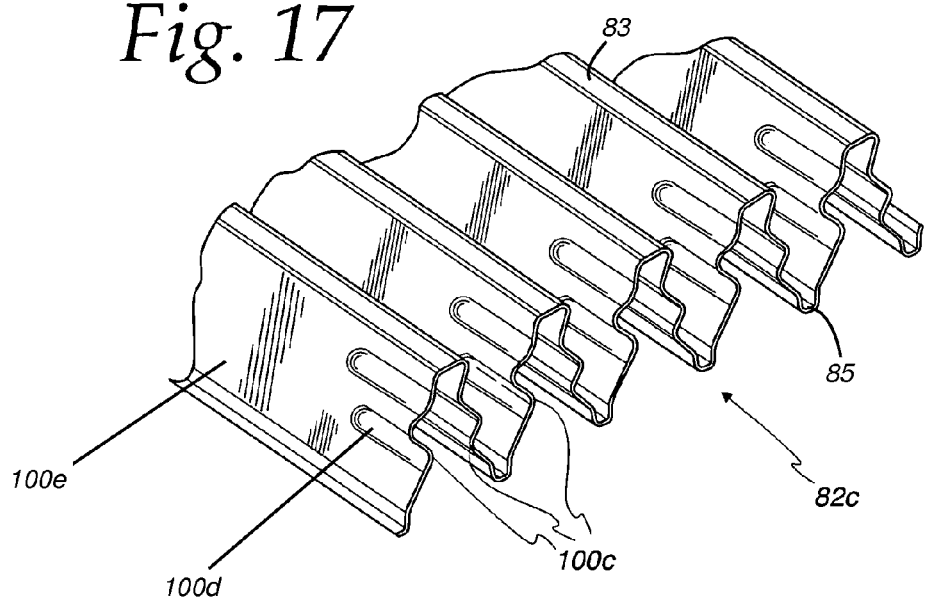
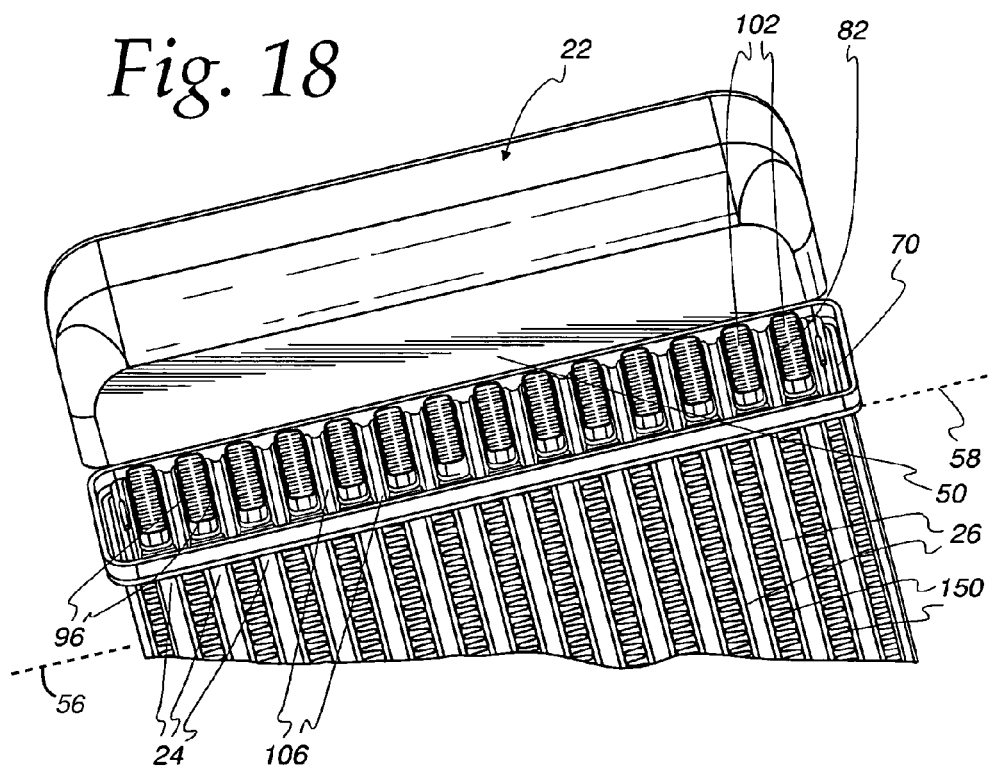

HEAT EXCHANGER WITH FLAT TUBES

CROSS REFERENCE TO RELATED APPLICATION(S)

Not applicable.

FEDERALLY SPONSORED RESEARCH OR DEVELOPMENT

Not applicable.

REFERENCE TO A MICROFICHE APPENDIX

Not applicable.

TECHNICAL FIELD

The present invention is directed toward heat exchangers, and particularly toward heat exchangers with flat tubes adapted to accommodate alternating temperature heat loads.

BACKGROUND OF THE INVENTION AND TECHNICAL PROBLEMS POSED BY THE PRIOR ART

Heat exchangers are known in which an inlet collecting tank distributes one medium in flat heat exchanger tubes and an outlet collecting tank receives the one medium from the flat heat exchanger tubes and convey it further. The collecting tank has a wall that extends around the entire periphery of the end of a stack of heat exchanger tubes and over a certain length section of the heat exchanger tubes, the wall having at least one inlet and/or an outlet for the other medium that flows between the heat exchanger tubes. An internal insert is arranged in the flat heat exchanger tubes, which is metallically bonded to the two broad sides of the heat exchanger tube.

Published European Patent application EP 1 376 043 A2 has these features, including a collecting tank for one medium designed in one part with the collecting tank for the other medium.

A multipart configuration is shown in EP 974 804 B1, in which the collecting tank for the one medium is joined to the collecting tank for the other medium and connected together with the other parts of the heat exchanger in the soldering furnace.

Heat exchangers incorporated, for example, in an exhaust gas recirculation system of a vehicle as an exhaust heat exchanger, may be inadequate to withstand the enormous alternating temperature loads, a problems which has been generally known since the beginning of construction of heat exchangers. Numerous solution proposals and expedients therefore have been proposed and used which may provide improvements for specific applications but do not eliminate the problem.

The present invention is directed toward overcoming one or more of the problems set forth above.

SUMMARY OF THE INVENTION

In one aspect of the present invention, a heat exchanger is provided including a plurality of stacked flat tubes, the tubes having facing broad sides adjacent one another in the stacking direction. At least one collecting tank is connected to an end of the stacked flat tubes whereby a first medium may be distributed through the collecting tank and flat tubes, with the collecting tank including a wall extending around the entire periphery of the end of the stacked flat tubes. Internal inserts str in the flat tubes, with the inserts being bonded between the broad sides of the tubes and, in the region of connection of the tubes to the collecting tank, being configured to compensate for length changes in the stacking direction caused by temperature changes.

In one form of this aspect of the present invention, the compensating configuration of the internal inserts comprise at least one recess in the inserts in the region of the connection of the tubes to the collecting tank. In a further form, the recess extends generally transverse to the stacking direction. In another further form, the internal inserts comprise corrugated sheets with wave flanks extending between the tube broad sides, and the recess is in at least one of the wave flanks. In still another further form, the recess is a V-shaped cut-out open toward the end of the stacked flat tubes and, in yet a further form, the V-shape cut-out is a non-uniform taper.

In another form of this aspect of the present invention, the internal inserts comprise corrugated sheets with wave flanks, and the wave flanks are flexible in the stacking direction. In a further form, the wave flanks are corrugated.

In still another form of this aspect of the present invention, a second collecting tank connected to the other end of the stacked flat tubes is provided whereby the first medium may be distributed through the second collecting tank and flat tubes. The second collecting tank includes a wall extending around the entire periphery of the other end of the stacked flat tubes, and the internal inserts are further configured to compensate for length changes in the stacking direction caused by temperature changes in the region of connection of the tubes to the second collecting tank.

In yet another form of this aspect of the present invention, outwardly extending embossings are on the tube broad sides, and the embossings of adjacent tubes in the tube stack maintain a spacing between adjacent broad sides to define a flow channel for a second medium between the adjacent sides.

According to another form of this aspect of the invention, matching tube pieces are inserted into the ends of the heat exchanger tubes to reinforce the heat exchanger tubes. In a further form, the tube pieces have inserts with connectors running generally in the stacking direction, where the connectors have a contour permitting length changes in the stacking direction of the heat exchanger tubes.

According to still another form of this aspect of the invention, the collecting tank has a first selected one of an input and an output for communication of the first medium with the tubes, and is connected to a section of the tube stack bounded by two connection planes and communicating with flow paths defined between the tubes. The collecting tank also has a second selected one of an output and an input for communication of a second medium with the tube stack section. In a further form, a tube plate with connectors receives the tube stack end and defines one of the connection planes, wherein the tube plate is connected to the wall of the collecting tank and, in a further form, the broad sides of the tubes include deformations extending into the flow paths defined between the tubes to direct a portion of the flow of the second medium to the tube plate in order to cool it. In another further form, the other of the connection planes is defined by the wall of the collecting tank, where the wall defining the other connection plane has a cut-out having a peripheral contour of the stack of heat exchanger tubes and, in a still further form, the peripheral contour includes slits receiving edge flanges of the tubes and protrusions extending into grooves formed between adjacent tubes in the stacked tubes.

According to yet another form of this aspect of the invention, the heat exchanger is used as a selected one of a charge air cooler and an exhaust heat exchanger cooled with fluid in the exhaust gas recirculation system of vehicles.

In another aspect of the present invention, a tube for a heat exchanger is provided, including a flat tube having broad facing sides connected by narrow sides to define a flow path therebetween, and an internal insert within the flat tube, the insert being bonded between the broad sides of the tube and being configured to compensate for length changes between the broad sides caused by temperature changes.

In one form of this aspect of the present invention, the tube is adapted to connect to the wall of a collecting tank of a heat exchanger, and the internal insert is corrugated with wave flanks between the broad sides, the wave flanks having a recess therein in the region of the connection of the tube to the collecting tank wall and extending generally in the direction of the broad sides. In a further form, the internal insert is corrugated with wave flanks between the broad sides, and the wave flanks are corrugated in the direction between broad sides.

In another form of this aspect of the present invention, the internal insert is corrugated with wave flanks between the broad sides, and the wave flanks are corrugated in the direction between broad sides.

BRIEF DESCRIPTION OF THE DRAWINGS

FIG. 17 is a perspective view of a portion of yet another tube insert which may be used with the present invention; and FIG. 18 is a partial view of a charge air cooler with heat exchanger tubes having internal inserts according to the present invention.

DETAILED DESCRIPTION OF THE INVENTION

Figure 1:
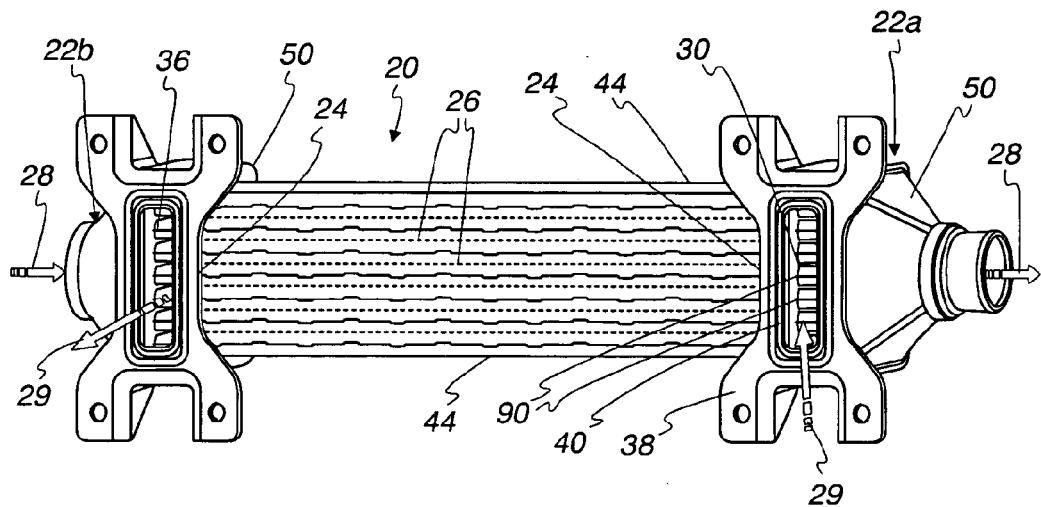
FIG. 1 is an overall view of a heat exchanger according to one embodiment of the invention.

The practical examples in FIGS. 1-12 are exhaust gas heat exchangers 20 which may be incorporated in a manner (not shown) in the exhaust gas recirculation system of a vehicle and utilize the coolant of the vehicle engine as cooling medium. However, it should be appreciated that the heat exchanger can be used with equal advantages as a charge air cooler cooled with coolant or for other purposes, especially where high alternating temperature loads occur.

In the illustrated practical examples, one collecting tank 22 is provided on each end 24 of a stack of heat exchanger tubes 26. Consequently, the exhaust (arrow 28) in the heat exchanger 20 depicted in FIG. 1 flows in at the left collecting tank 22b, is distributed to and flows through the heat exchanger tubes 26, and then leaves the heat exchanger 20 via the other collecting tank 22a on the right. The cooling liquid (dashed arrow 29) enters the inlet 30 of the right collecting tank 22a, is distributed to and flows through the flow channels 34 arranged between the heat exchanger tubes 26 (as described below in connection with FIGS. 3-4), and then leaves the heat exchanger 20 via the outlet 36 provided in the left collecting tank 22a.

It should be understood that while the disclosed embodiments show substantially one direction flow through the heat exchanger tubes 24, it would be within the scope of the present invention for a heat exchanger 20 to provide flow in a U-shape, in which case the inlet and outlet may be provided in the same tank (i.e., at the same end of the heat exchanger 20).

It should also be understood that while various features which may be advantageously incorporated as a part of the invention are disclosed herein with respect to the tubes 26, various different tube configurations may nonetheless be used in a heat exchanger which incorporates the present invention. For example, the tubes 26 may be drawn flat tubes or flat tubes welded with a longitudinal seam. Moreover, it should be understood that flat heat exchanger tubes 26 are those having a smaller and a larger internal dimension, and are not limited to those with parallel broad sides but also encompass heat exchanger tubes with an oval cross-section.

The inlet 30 and the outlet 36 in this practical example have a roughly rectangular cross-section, though other shapes could be advantageously used. Mounts 38 made by a deformation process from a suitable material such as sheet metal may be advantageously provided on the collecting tanks 22a, 22b, extending around three sides of the collecting tanks 22a, 22b for firm soldering thereon. The mounts 38 include inlet 30 and outlet 36, respectively, and an appropriate sealing groove 40 so that the heat exchanger may advantageously be directly fastened to a connection plane of a unit (not shown) so as to provide a sealed path for the supplied coolant.

The stack of heat exchanger tubes 26 is covered by an upper and lower reinforcement plate 44, providing protection from mechanical effects on tubes 26 and higher stability of the entire heat exchanger 20 in view of the relatively small sheet thickness of the heat exchanger tubes 26.

Figure 2:
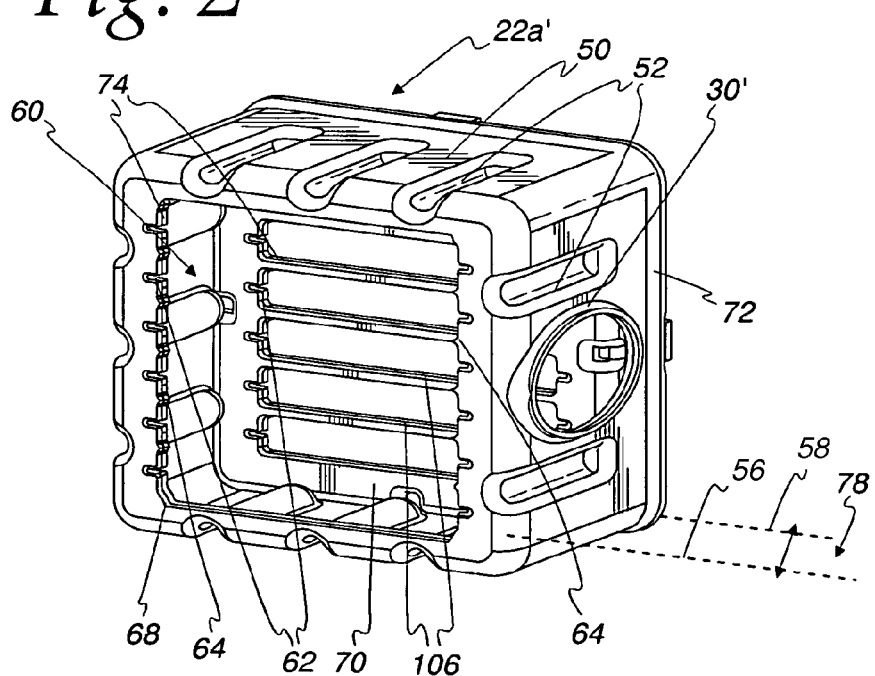
FIG. 2 is a perspective view of a collecting tank part the FIG. 1 embodiment.
Figure 3:
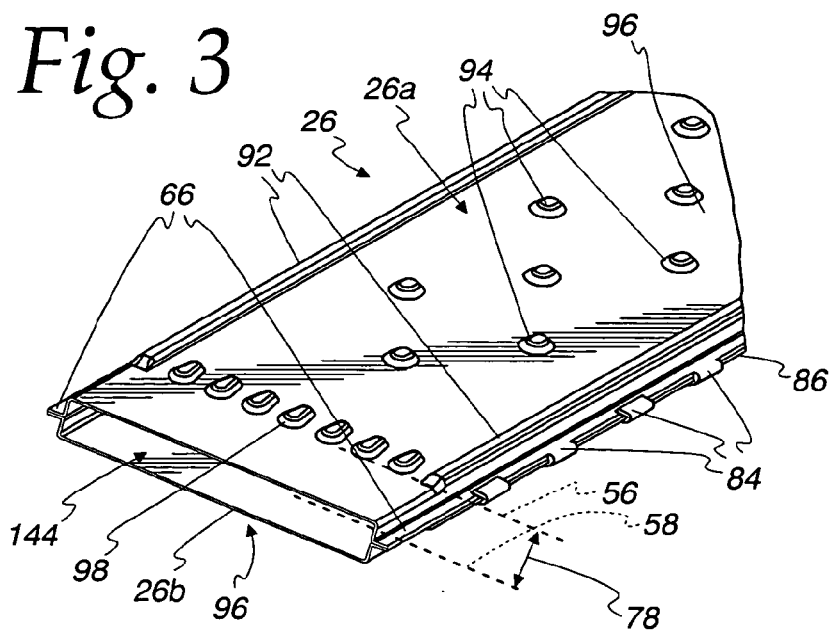
FIG. 3 is a perspective view of a heat exchanger tube.

FIG. 2 shows the collecting tank 22a' in a first practical example in a perspective view, as is present twice in the practical example of FIG. 1, apart from the cross-sectional shape of the inlet 30', which is round as opposed to the roughly rectangular shape in FIG. 1. FIG. 3 shows one of the plurality (e.g., seven) of heat exchanger tubes 26 usable with the illustrated collecting tank, wherein the wall 50 of the collecting tank 22a' has a deformation 52 (which may also be advantageously provided in the wall 50 of the other collecting tank 22b) which may both contribute to stability and permit a certain elasticity during alternating temperature loads.

The collecting tank 22a' defines two connection planes 56, 58 between the wall 50 and the stack of heat exchanger tubes 26, whereby the coolant inlet and outlet (30, 36) maybe be advantageously closed off at those planes 56, 58 whereby coolant flows around the outside of the tubes 26 in that area.

For example, a direct connection of the wall 50 to the stack of tubes 26 is provided in one connection plane 56 by a cut-out 60 that represents the peripheral contour of the stack, including slits 62 and protrusions 64. Each slit 62 is intended to receive an edge flange 66 of a tube 26 (see FIG. 3). The cut-out 60 also may advantageously include an upper and lower gradation 68 in order to be able to accommodate the reinforcement plates 44. In the other connection plane 58, an indirect connection to the wall 50 is present, since in this practical example a tube plate 70 is connected in-between was provided. For this purpose, the edge of the wall 50 is stepped at 72 so that the tube plate 70 has a seat with a stop in the wall 50. The already-mentioned slits 62 are also found in the contour of tube plate 70 and they serve the same purpose there.

Figure 11:
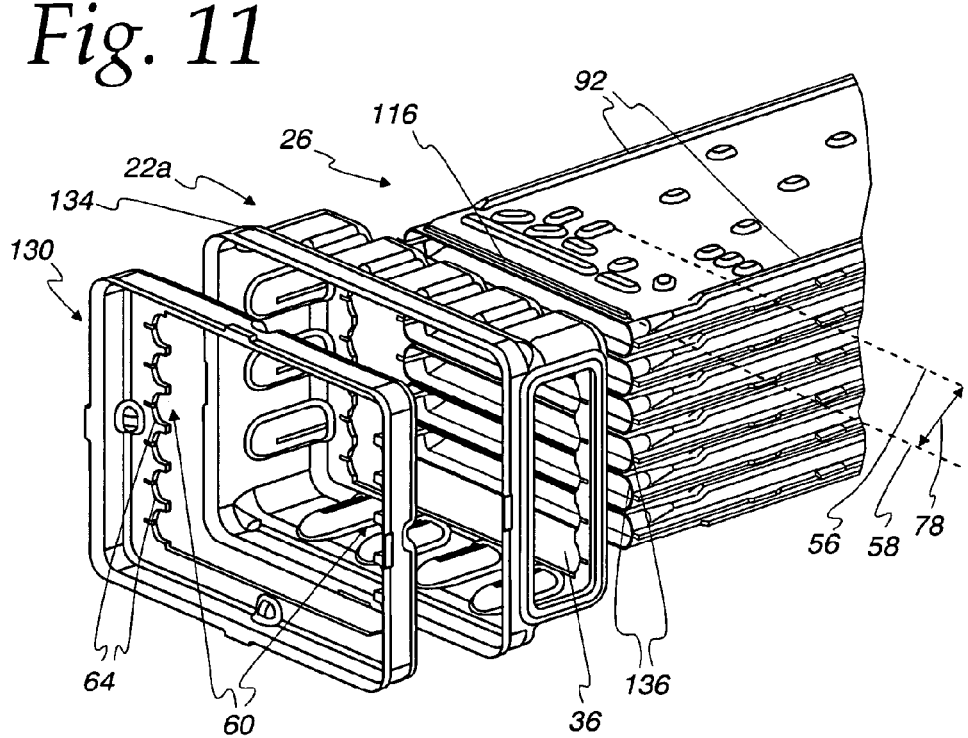
FIG. 11 is an exploded view of a heat exchanger of a practical example using FIGS. 9 and 10.

The inlet 30 and the outlet 36 for the cooling liquid are arranged between the joining planes 56, 58 of their respective collecting tanks 22a, 22b (see, e.g., FIGS. 1-2 and 11).

The edge of the cut-out 60 and the edge of the tube plate openings may be advantageously formed with a small passage 74 (see FIG. 2) to contribute to achievement of a perfect soldering joint with the tubes 26 even given the relatively small thickness of the wall 50. The passage 74 faces the center of the heat exchanger 20, and is produced by corresponding design of the stamping tool for production of the cut-out 60, making manufacture possible without additional expense. Note that this design of the cut-out 60 may be advantageously used in all practical examples of the exhaust heat exchanger 20 even if not shown in detail in the figures for each practical example.

As shown in FIG. 3, an end section 78 of the heat exchanger tubes 26 may extend generally between the two connection planes 56 and 58. The heat exchanger tubes 26 are assembled in the stacking direction 80 (see FIG. 4) into a stack of heat exchanger tubes 26 with the reinforcement plates 44 added to the top and bottom. As described further below, an internal insert 82 is introduced into each heat exchanger tube 26, which may consist of two identical flat tube halves 26a, 26b, which is particularly cost-effective and is characterized by high process reliability, especially during soldering. The flat tube halves 26a, 26b may be assembled by means of bent brackets 84 on the edge flange 86. The stack is assembled with the length of section 78 of the heat exchanger tubes 26 in the collecting tanks 22a, 22b, with each edge flange 86 of each heat exchanger tube 26 lying in the connection plane 56 in a slit 62 and sits in the other connection plane 58 in a slit 62 of the tube plate 70 (see above).

Figure 4:
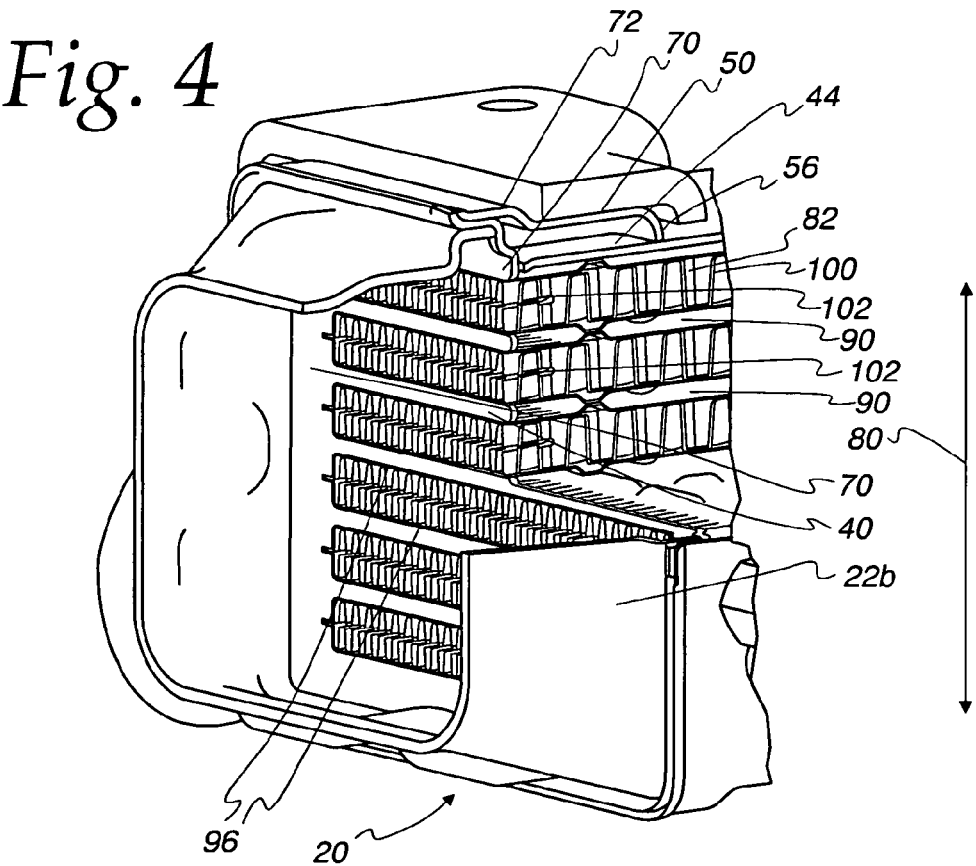
FIG. 4 is a partially cut-away view of part of the heat exchanger of FIG. 1.

FIG. 4 illustrates one end of the heat exchanger tubes 26 in the heat exchanger 20. It should be apparent from FIG. 4 that, as previously mentioned, a flow channel 90 is formed between heat exchanger tubes 26, through which the coolant can flow. As can be seen in FIG. 3, two deformations 92 extend on the long edges of the identical flat tube halves 26a, 26b and are connected to seal off a flow channel 90 between joined heat exchanger tubes 26. Additional elevations or deformations 94 may also be advantageously provided on the broad sides 96 of the heat exchanger tubes 26 to assist in maintaining the spacing between the sides 96, as well as potentially assisting in heat exchange. In the vicinity of connection plane 56, a row of protrusions 98 may also be advantageously provided as shown to assist in equalization of the coolant flow which enters or exits in the vicinity (e.g., see the arrows in FIG. 8).

As is further clearly shown in FIG. 4, corrugated internal inserts 82 may advantageously be provided in all heat exchanger tubes 26. The internal inserts 82 of the depicted practical example are those whose wave flanks 100 are corrugated in the longitudinal and transverse direction. The wave flanks 100 may also advantageously include a recess 102 provided roughly in the center of the height of the internal insert 82 or in the center between the two broad sides 96 of the corresponding heat exchanger tube 26. The length changes occurring because of alternating temperatures in the stacking direction 80 of heat exchanger tubes 26 are therefore permitted or compensated. In particular, the distinct nature of the advantage achieved by this with reference to resistance to alternating temperature loads was found to be surprising, with such heat exchangers 20 capable of withstanding more than 80,000 temperature change cycles, which is many times greater than the performance of the prior art. In fact, evaluation of an extensive series of experiments has shown that the resistance of the heat exchanger according to the present invention relative to alternating temperature loads may be advantageously increased by a factor of two to three in comparison with the prior art mentioned in the background of the invention In FIG. 4, the recess 102 is provided in the region of the indirect connection plane 58. The ends of the heat exchanger tubes 26 sit in openings of the tube plate 70 including connectors 106 which may advantageously include a contour in cross-section in order to support the flexibility of the heat exchanger 20 relative to temperature changes (see FIG. 6).

It should be appreciated that when used with heat exchanger tubes 26 of particularly great length, it may be desirable to assemble or "piece together" the internal insert from several individual internal inserts (rather than one long insert). In such cases a recess 102 may be advantageously provided on both ends of the individual pieces of the internal inserts 82, simplifying assembly of the heat exchanger tubes by avoiding a requirement that the internal insert pieces be inserted with the "right" ends into the heat exchanger tube 26.

Figure 5:
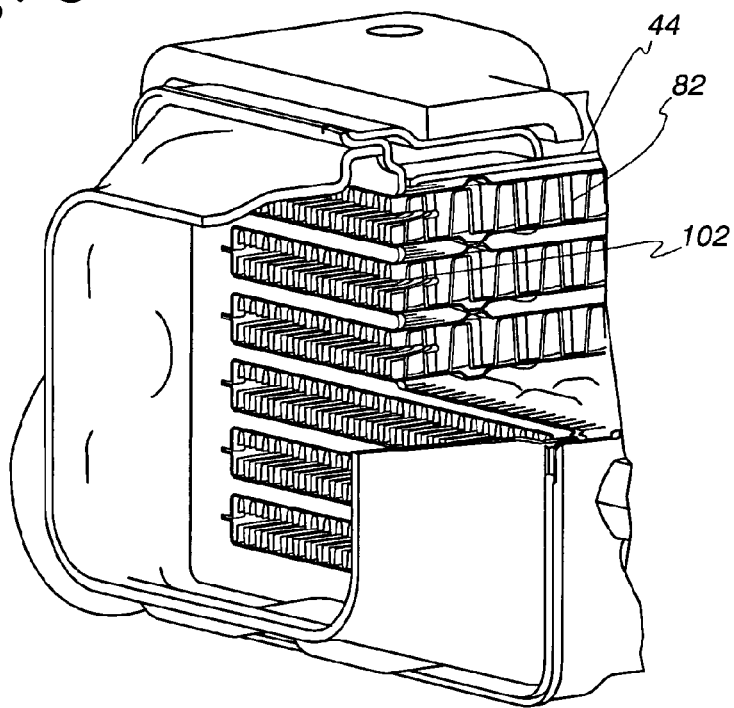
FIG. 5 is similar to FIG. 4, but shows a V-shaped recesses in the tube inserts.
Figure 6:
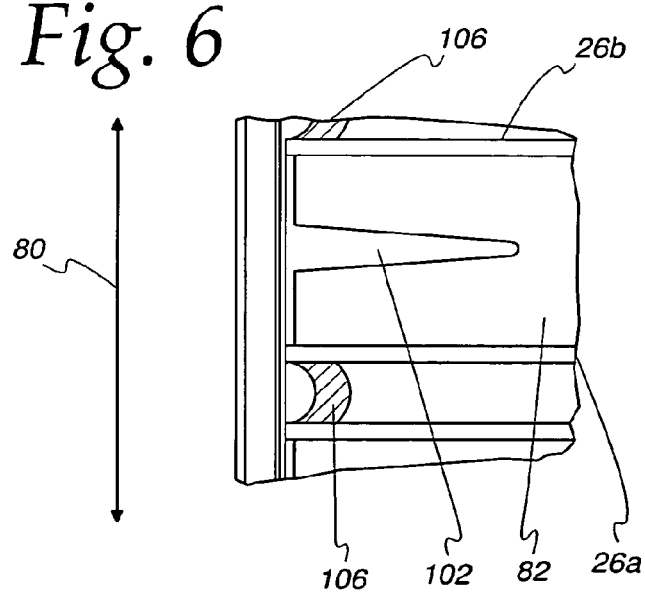
FIG. 6 is a detailed cross-sectional illustration of a tube and insert with a V-shaped recess such as shown in FIG. 5.

It has also been found in connection with the present invention that appreciable improvements may be achieved by choosing the depth of recess 102 as well as its shape and position so that sufficient space is present for optimization measures along these lines. While a relatively short recess 102 is shown in FIG. 4, it should be appreciated that the depth of the recess 102 may extend over the entire length of the end section 78 between the connection planes 56, 58 of the heat exchanger tubes 26. Further, a V-shaped recess 102 as shown in FIG. 6 has also been found to be an advantageous shape. In addition, it has been found that it is advantageous to use the geometry of the V-shaped recess 102 not only over the entire width of the internal insert 82 uniformly, but to reduce the "V" toward the center (not shown). However, it should also be understood that it would be within the scope of the present invention to use an internal insert 82 having a V-shaped recess 102 whose geometry is constant over the entire width of the internal insert 82 as shown in FIG. 5.

Internal inserts 82 whose wave flanks 100 are corrugated between a wave crest and a wave trough, or in the direction between the broad sides 96 of the heat exchanger tube 26, may also be advantageously used according to one aspect of the present invention. Such a configuration may advantageously provide desired flexibility in the stacking direction 80.

Since the loads from temperature changes in an exhaust heat exchanger reach the boundary regions owing to the level of the temperature difference and the frequency of the temperature alterations, more cost-effective manufacturing methods of mass-production can still be implemented with the usual materials (stainless steel, aluminum) and joining techniques in accordance with the present invention, which has experimentally been found to be advantageous.

Figure 7:
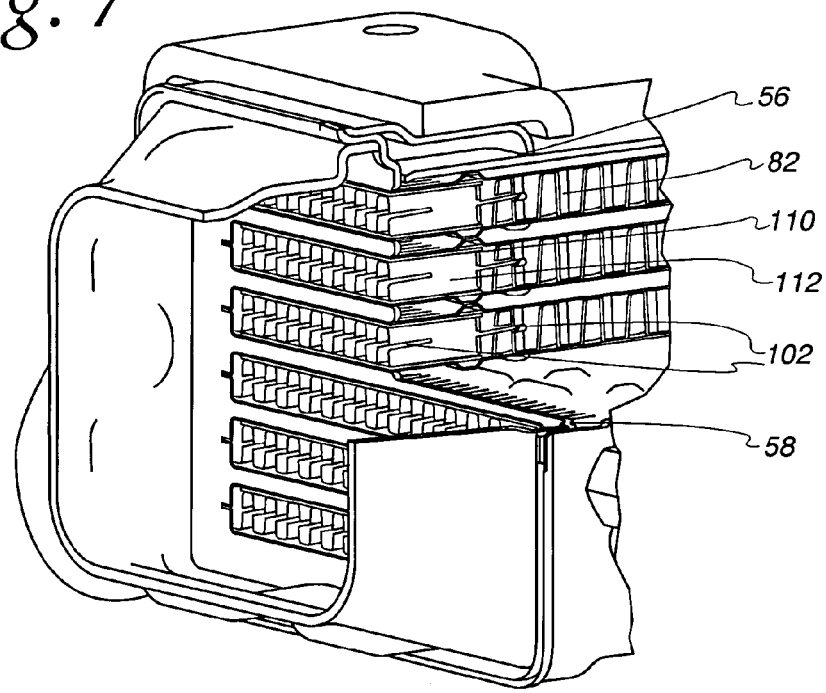
FIG. 7 is a view similar to FIG. 4 of a third practical example.
Figure 8:
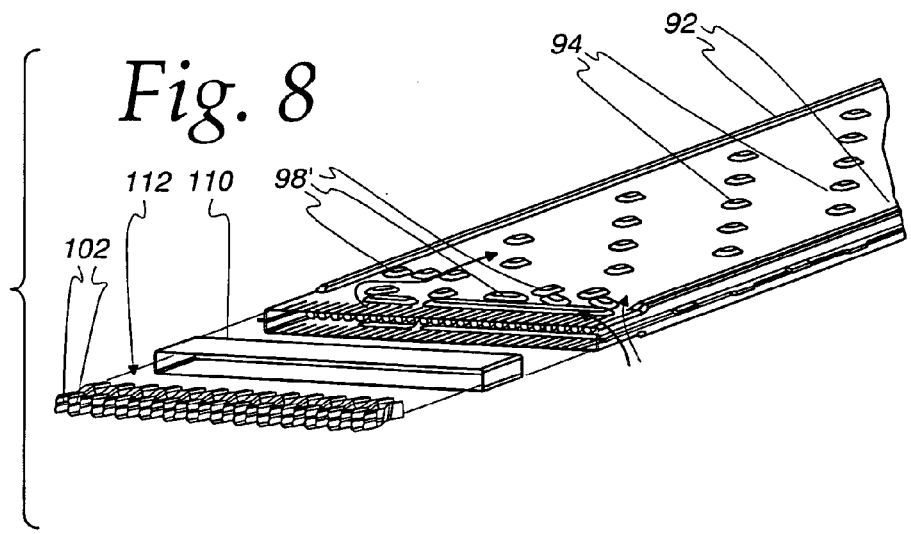
FIG. 8 is an exploded perspective view of a tube and insert structure of the third practical example of FIG. 7.

FIGS. 7 and 8 illustrate another advantageous embodiment embodying aspects of the present invention. For clarity, only those reference numbers that represent an essential difference relative to the embodiment of FIG. 4 are used in FIG. 7. Specifically, in FIG. 7, recesses 102 in the internal inserts 82 are included at the other connection plane 56. Further, tube pieces 110 are inserted into the ends of the heat exchanger tubes 26, which in turn also have an insert 112 (see FIG. 8). The tube pieces 110 extend over the length of section 78 of the heat exchanger tubes 26. The inserts 112 in FIG. 8 also have a recess 102. However, it may at times be advantageous from the standpoint of manufacturing technology to dispense with recess 102 and to configure the insert 112 so that it can compensate for length changes in the stacking direction 80 of heat exchanger tubes 26 in a different way, for example, with corrugated wave flanks 100 in the direction between the broad sides 96, as previously described (and as shown in FIGS. 13-16 discussed below).

Such tube pieces 110 have proven to be advantageous in a variety of respects. For example, they facilitate achieving high-quality soldering joints between the tubes 26 and the collecting tanks 22. Such connections may be difficult where the wall thickness of the parts being joined is significantly different, as is typically the case, for example, between the tube plate/collecting tank and the heat exchanger tube since, for reasons of efficient heat transfer, the tubes 26 should only have a wall thickness of a few tenths of a millimeter, whereas the tube plate 70/collecting tanks 22 can have a thickness up to 2.0 mm owing to the strength expected of them. The required soldering temperature is reached sooner in the thin-walled parts than in the thicker parts, causing soldering problems. The tube pieces 110 may produce greater equalization of wall thicknesses (by adding thickness of the walls of the tube in the area of the connection to the collecting tanks 22) and therefore provide better soldering results. Moreover, such tube pieces 110 may also allow still thinner walls to be used with the tubes, providing numerous advantages such as cost reductions and more efficient heat transfer.

It should also be recognized that the protrusions 98' on the flat tube halves 26a, 26b in FIG. 8 are different than the protrusions 98 in FIG. 3, with the protrusions 98' in the region of connection plane 58 concentrated so as to divert the incoming coolant whereby a significant part of it is initially directed toward the connection plane 58 before it can flow into the flow channels 90. Diverting flow to achieve better temperature equalization may advantageously improve load capability relative to alternating temperatures.

Figure 9:
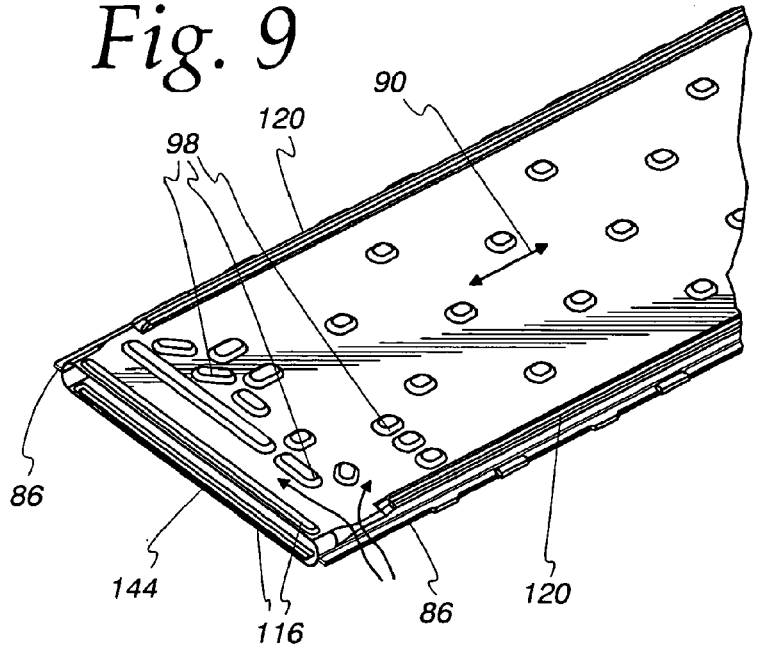
FIG. 9 is a perspective view of a part of a heat exchanger tube of another practical example.
Figure 10:
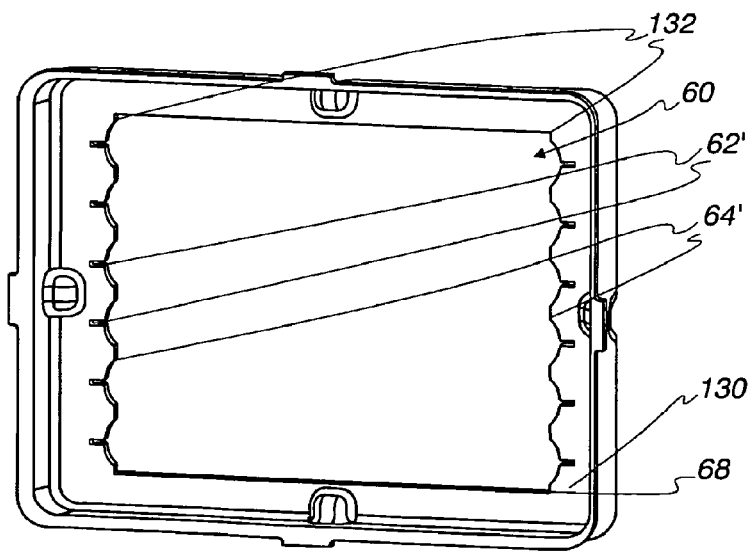
FIG. 10 is a perspective view of a tube plate usable in conjunction with the practical example of FIG. 9.

In the alternate embodiment of FIG. 9, the flat tube halves 26a, 26b include additional deformations 116 extending across the broad sides 96 of the ends, the height of such deformations coinciding with the height of the embossings 120 running along the long sides. The additional deformations 116 of adjacent heat exchanger tubes 26 therefore lie against each other and seal off a flow channel 90, enabling the heat exchanger 20 to be an essentially housing less design making thrifty use of material with the highest efficiency of heat transfer. A traditional tube plate 70 with connectors 106 (see FIG. 2) such as previously described can therefore be eliminated in favor of an intermediate plate 130 such as shown in FIGS. 10 and 11. As shown in those figures, the intermediate plate 130 (in similar fashion to the wall 50 in the other connection plane) is equipped with slits 62' and protrusions 64' in order to correspond to the peripheral contour of the stack of heat exchanger tubes 26. Reference number 136 (FIG. 11) indicates the grooves 136 of the stack of heat exchanger tubes 26 into which the protrusions 64' extend.

Connection of the intermediate plate 130 to the wall 50 occurs via a gradation 134 in the wall 50, which offers a stop and a seat for the intermediate plate 130 (such as with the tube plate 70 described in conjunction with FIG. 4). The peripheral contour in intermediate plate 130 also has shoulders 132 to accommodate the reinforcement plates 44. It should be appreciated that an additional weight and cost reduction may be achieved by providing an intermediate plate 130.

Figure 12:
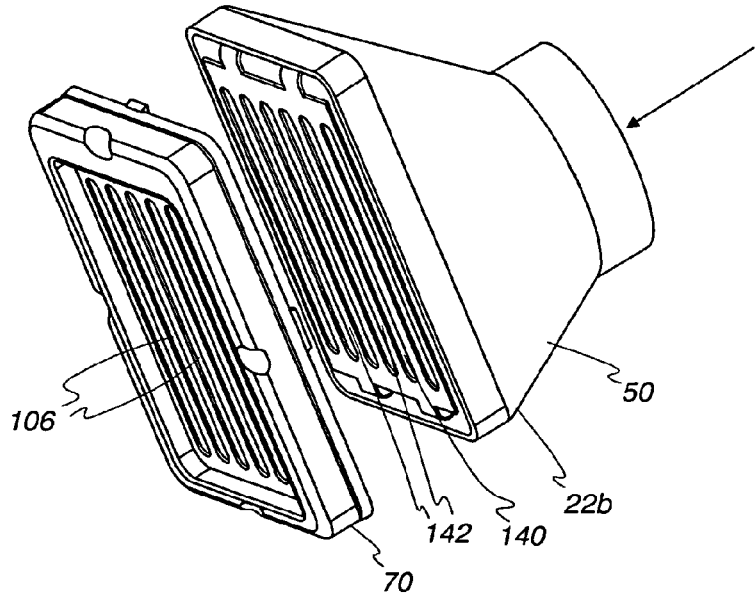
FIG. 12 is a perspective view of a heat protection shield of a collecting tank.

FIG. 12 illustrates another expedient that contributes to improving the resistance to alternating temperatures of the heat exchanger wherein a heat protection shield 140 is bonded metallically at four points to the collecting tank 22bb. The shield 140 has slits 142 which are slightly smaller in cross-section than the cross-section 144 (see FIG. 9) of each heat exchanger tube 26, and extend in this practical example into the openings of the tube plate 70 with connectors. The shield 140 is arranged at optimized spacing from the openings of the heat exchanger tubes 26. With such a structure, the temperature differences in the region of the connection planes 56 or 58 may be reduced.

Figure 13:
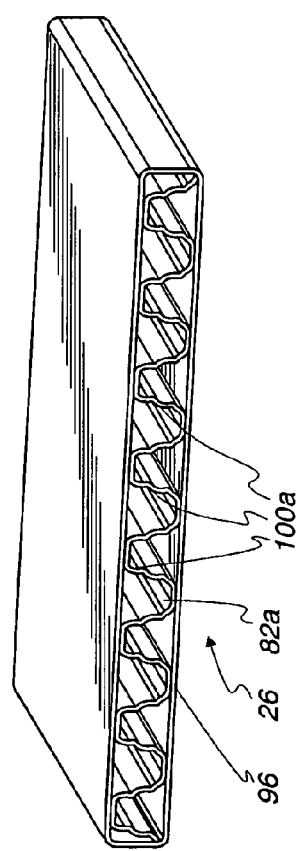
FIGS. 13 and 14 are perspective views of one embodiment of a heat exchanger tube with an internal insert.
Figure 14:
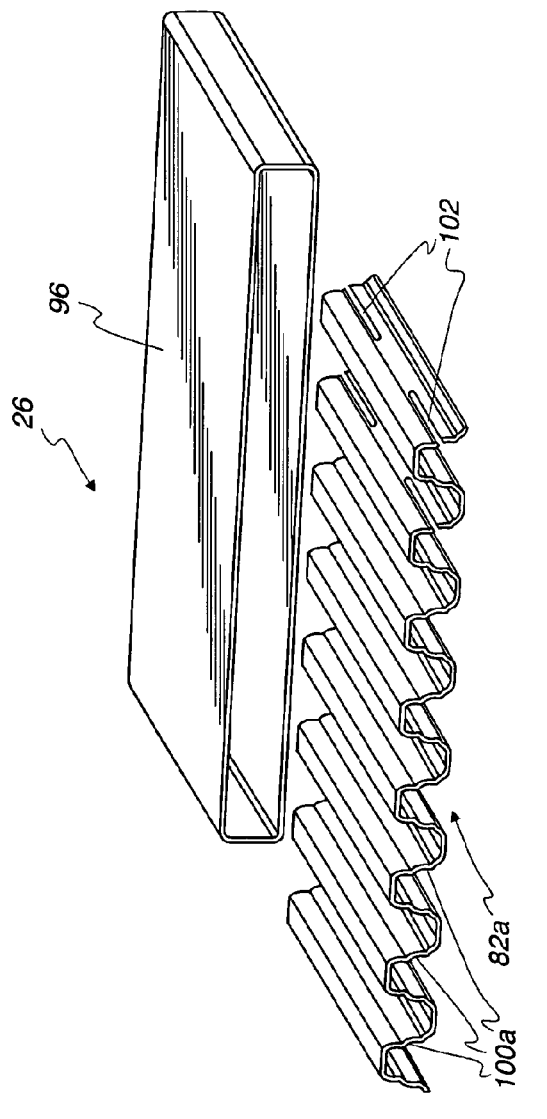

FIGS. 13 and 14 show a heat exchanger tube 26 with an internal insert 82a (or with an insert 112 as is present in tube pieces 110), which was described in conjunction with the practical example of FIG. 7. The connectors 106a and the wave flanks 100a of the internal insert 82a (or 112 in a tube piece 110) are designed corrugated in the direction between broad sides 96 so that length changes caused by temperature changes in the mentioned direction are compensated. The internal insert 82a (or insert 112) may be advantageously provided on both ends with a recess 102 (see FIG. 14). The recess 102 is shown in two wave flanks 100a but it should be understood that it may be advantageously provided in all wave flanks 100a so that assembly errors which might occur from "incorrectly" inserted inserts 82a, 112 may thereby be avoided.

Figure 15:
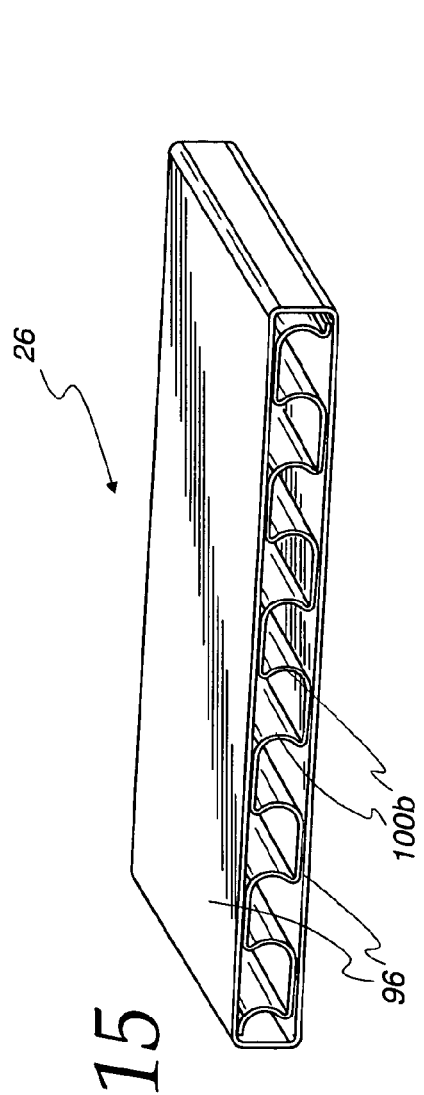
FIGS. 15 and 16 are perspective views of a second embodiment of a heat exchanger tube with internal insert.
Figure 16:
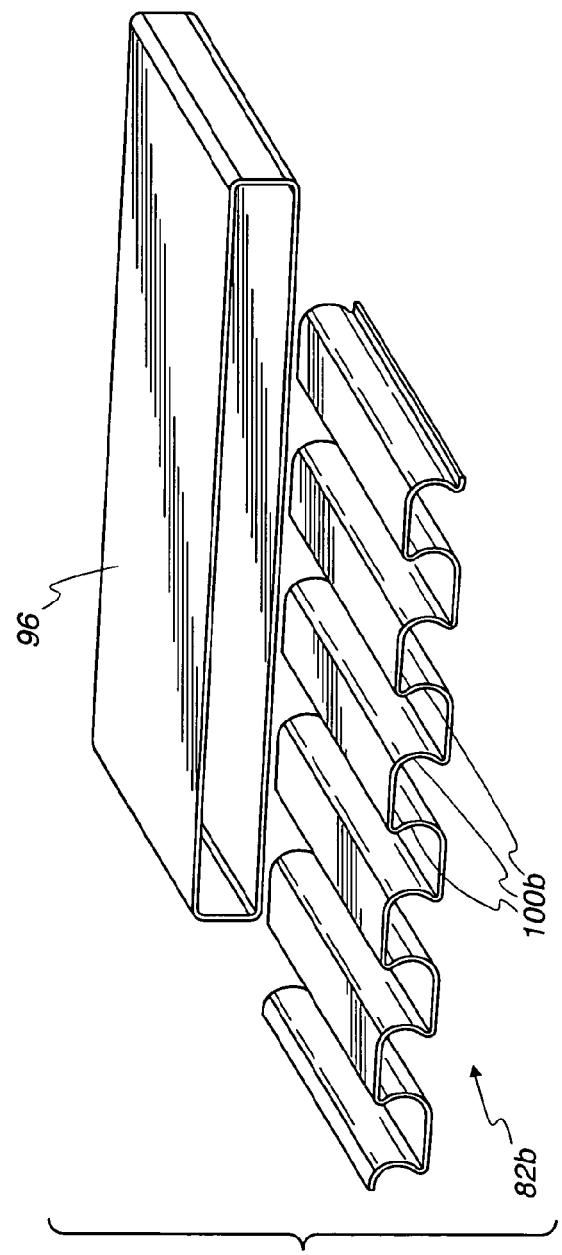

FIGS. 15 and 16 show yet another internal insert 82b embodying at least one aspect of the present invention. (It should be understood that a similar insert 112 may be used if a tube piece 110 is used). The wave flanks 100b running between the broad sides 96 of heat exchanger tube 26 have a bent contour so that they are also flexible in the direction between the broad sides 96. The illustrated wave flanks 100b are substantially continuous along an entire length of the heat exchanger tube 26. Heat exchanger tubes 26 such as illustrated, shaped and welded from a sheet metal strip, can be provided in the entire heat exchanger as shown in FIG. 18. Since they can be produced in any lengths, they are also suitable for production of the tube pieces 110 as well, which then need only be cut to length from an "endless" heat exchanger tube 26, after the insert has been inserted into heat exchanger tube 26.

FIG. 17 shows a portion of an insert 82c similar to that of FIGS. 13 and 14, whose wave flanks 100c are only slightly corrugated on one end. Corrugation of the wave flanks 100c (and connectors 106) is provided in the direction between the broad sides 96 of the heat exchanger tube 26 and it lies in the region of one or both connection phrase planes 56, 58. The illustrated wave flanks 100b are continuous along a substantial portion of the length of the insert 82c.

When the FIG. 13-17 disclosures are applied to tubes 26 with tube pieces 110, it should be appreciated that the tube pieces 110 will function to accommodate different temperature loads as a result of the tube piece inserts 112 having connectors that permit length changes in the stacking direction of the heat exchanger tubes (as a result of, e.g., connectors having a contour which is arc-shaped or zig-zag and therefore flexible in the stacking direction of the heat exchanger tubes under alternating temperature loads). Moreover, such connectors (e.g. 100a-100c) also advantageously prevent the broad sides of the tube pieces 110 from "falling in" during soldering, and therefore contribute to high-quality soldering joints. The tube pieces can be produced particularly favorably by cutting drawn or welded flat tubes to length with a corresponding insert.

Finally, FIG. 18 shows the use of flat heat exchanger tubes 26 in conjunction with an air-cooled charge air cooler. The charge air cooler has a collecting tank 22 with a wall 50. The ends of the heat exchanger tubes 26 extend into openings of a tube plate 70 at a connection plane 58 and are soldered there. The type of indirect connection provided in this example between the wall 50 and the heat exchanger tubes 26 via an intermediate tube plate 70 is without significance. The sometimes extremely hot charge air flows through the heat exchanger tubes 26 and corrugated ribs 150 are situated between the tubes 26, through which the cooling air flows. The connectors 106 between the openings in tube plate 70 are provided in cross-section with a contour such as shown in FIG. 6, in order to support flexible behavior under alternating temperature loads. An internal insert 82 is situated in tubes 26 and has a recess 102, which enters at least slightly into internal insert 82 and runs parallel to the broad sides 96 of heat exchanger tube 26.

Use of the described features means that breaks in the heat exchanger tube/tube plate connection occur at least more rarely. The individual parts of the heat exchanger are coated, if necessary, with a solder layer so that they can be metallically bonded in the soldering furnace.

The described different expedients that contribute to compensation for the length change caused by a temperature change in the stacking direction 80 of heat exchanger tubes 26 or across their broad sides 96 can naturally also be combined, as required.

It should therefore be recognized that the present invention as disclosed herein may advantageously provide heat exchangers adapted to better withstand the enormous alternating temperature loads encountered, for example, in an exhaust heat exchanger in an exhaust gas recirculation system, and such heat exchanger may therefore meet the requirements imposed on it. In addition, the present invention provides a simple heat exchanger tube which advantageously leads to heat exchangers with which it is used being able to advantageously withstand higher alternating temperature loads.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

What is claimed is:

1. A heat exchanger, comprising:
   a plurality of stacked flat tubes, said tubes having facing broad sides adjacent one another in the stacking direction and first and second open ends;
   a collecting tank connected to at least one of the first and second open ends of said stacked flat tubes at a first connection plane, said first connection plane defined by a tube plate; and
   internal inserts in said flat tubes, the inserts having wave crests and troughs defining flanks therebetween extending in a direction substantially parallel to a flow path of a first medium from the first to the second open end of the plurality of flat tubes, the inserts being bonded between said broad sides of said tubes at the wave crests and troughs, and including a corrugation extending in parallel to the flow path along at least one of the flanks from said at least one of the first and second open ends and terminating at a point proximal to the first connection plane, the flank flexing in the stacking direction at the corrugation during thermal cycling, wherein at least one of the flanks is continuous along a substantial portion of the flow path beyond the tube plate.

2. The heat exchanger of claim 1, wherein said internal inserts comprise corrugated sheets with flanks extending between facing broad sides of a tube, and said flanks are flexible in the stacking direction.

3. The heat exchanger of claim 2, wherein said flanks include multiple corrugations extending in parallel to the flow path.

4. The heat exchanger of claim 1, further comprising a second collecting tank connected to the other end of said stacked flat tubes whereby the first medium may be distributed through said second collecting tank and flat tubes, said second collecting tank connected to said other end of said stacked flat tubes at a second connection plane, the second connection plane defined by a tube plate, wherein said internal inserts are further configured to compensate for length changes in the stacking direction cause by temperature changes in the region of the second connection plane.

5. The heat exchanger of claim 1, further comprising outwardly extending embossings on said tube broad sides, said embossings of adjacent tubes in said tube stack maintaining a spacing between adjacent broad sides to define a flow channel for a second medium between said adjacent sides.

6. The heat exchanger of claim 1, further comprising matching tube pieces inserted into the ends of the heat exchanger tubes to reinforce the heat exchanger tubes.

7. The heat exchanger of claim 1, wherein said collecting tank:
   has a first selected one of an input and an output for communication of said first medium with said tubes;
   is connected to a section of said tube stack bounded by two connection planes and communicating with flow paths defined between said tubes; and
   has a second selected one of an output and an input for communication of a second medium with said tube stack section.

8. The heat exchanger of claim 7, wherein a tube plate with connectors receiving said tube stack end defines one of said connection planes, wherein said tube plate is connected to the wall of the collecting tank.

9. The heat exchanger of claim 8, wherein said broad sides of said tubes include deformations extending into said flow paths defined between said tubes to direct a portion of the flow of the second medium to the tube plate in order to cool it.

10. The heat exchanger of claim 7, wherein the other of said connection plates is defined by the wall of said collecting tank, said wall defining said other connection plane having a cut-out having a peripheral contour of the stack of heat exchanger tubes.

11. The heat exchanger of claim 10, wherein the peripheral contour includes slits receiving edge flanges of said tubes and protrusions extending into grooves formed between adjacent tubes in said stacked tubes.

12. The heat exchanger of claim 1, wherein said heat exchanger is selected from the group consisting of a charge air cooler and an exhaust heat exchanger cooled with fluid in the exhaust gas recirculation system of vehicles.

13. A heat exchanger, comprising:
   a plurality of stacked flat tubes, said tubes having facing broad sides adjacent one another in the stacking direction and first and second open ends;

a collecting tank connected to one of the first and second open ends of said stacked flat tubes, at a connecting plane, the connecting plane defined by a tube plate;

an internal insert positioned within at least one of said flat tubes, the insert having wave crests and troughs defining flanks therebetween extending in a direction substantially parallel to the flow path of a first medium from the first to the second open end of the at least one tube, the wave crests and troughs of said insert being bonded to said broad sides of said at least one tube, said insert including a corrugation extending in parallel to the flow path along at least one flank from said at least one of the first and second open ends and terminating at a point beyond the connecting plane, wherein the at least one flank is continuous along a substantial portion of the flow path between the first and second open ends.

14. The heat exchanger of claim 13, wherein the flank flexes in the stacking direction at the corrugation during thermal cycling.

15. The heat exchanger of claim 13, wherein each flank of the insert includes the corrugation.

16. The heat exchanger of claim 13, wherein the first medium is exhaust gas.

17. The heat exchanger of claim 13, and further comprising a second collecting tank connected to the other of the first and second open ends of said stacked flat tubes.

18. The heat exchanger of claim 13, wherein the second collecting tank defines a second connecting plane, said insert including a corrugation extending in parallel to the flow path along the at least one flank from the other of the first and second open ends and terminating at a point beyond the second connecting plane.

19. The heat exchanger of claim 13, wherein the at least one flank is flat along a substantial portion of the flow path between the first and second collecting tanks.

20. A heat exchanger, comprising:
a plurality of stacked flat tubes, said tubes having facing broad sides adjacent one another in the stacking direction and first and second open ends;
a collecting tank connected to one of the first and second open ends of said stacked flat tubes, said collecting tank defining a connecting plane;
an internal insert positioned within at least one of said flat tubes, the insert having wave crests and troughs defining flanks therebetween extending in a direction substantially parallel to the flow path of a first medium from the first to the second open end of the at least one flat tube, the wave crests and troughs of said insert being bonded to said broad sides of said at least one flat tube, said insert including a configuration localized to the region of the connecting plane which compensates for length changes in the stacking direction caused by temperature changes.

21. The heat exchanger of claim 20, wherein each flank includes a configuration localized to the region of the one connecting plane to compensate for length changes in the stacking direction caused by temperature changes.

22. The heat exchanger of claim 20, wherein the first medium is exhaust gas.

23. The heat exchanger of claim 20, and further comprising a second collecting tank connected to the other of the first and second open ends of said stacked flat tubes.

24. The heat exchanger of claim 21, wherein the second collecting tank defines a second connecting plane, said insert including a corrugation extending in parallel to the flow path along the at least one flank from the other of the first and second open ends and terminating at a point beyond the second connecting plane.

25. The heat exchanger of claim 23, wherein the at least one flank is flat along a substantial portion of the flow path between the first and second collecting tanks.

26. A heat exchanger, comprising:
a plurality of stacked flat tubes, said tubes having facing broad sides adjacent one another in the stacking direction and first and second open ends;
an internal insert positioned within at least one of said flat tubes, the insert having wave crests and troughs defining flanks therebetween extending in a direction substantially parallel to a flow path of a first medium between the first and second open ends of the at least one tube, the wave crests and troughs of said insert being bonded to said broad sides of said at least one tube, at least one of the wave flanks including a corrugation extending in parallel to the flow path from the first open end to a termination point between the first and second open ends, said corrugation providing said insert with increased flexibility in the stacking direction in a region from the first open end to the termination point; and
a collecting tank receiving said stacked flat tubes at a connection plane, said connection plane being located in the region of increased flexibility,
wherein at least one of the flanks is continuous along a substantial portion of the flow path.

27. The heat exchanger of claim 1, wherein the corrugation terminates at a point in the first connection plane.

* * * * *

UNITED STATES PATENT AND TRADEMARK OFFICE
CERTIFICATE OF CORRECTION

| | | |
|---|---|---|
| PATENT NO. | : 8,261,816 B2 | Page 1 of 1 |
| APPLICATION NO. | : 11/015159 | |
| DATED | : September 11, 2012 | |
| INVENTOR(S) | : Ambros et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 708 days.

Signed and Sealed this
Eleventh Day of November, 2014

Michelle K. Lee
*Deputy Director of the United States Patent and Trademark Office*